「1」

(12) United States Patent
Atluri et al.

(10) Patent No.: US 8,424,287 B2
(45) Date of Patent: Apr. 23, 2013

(54) ELECTRIC PREHEATING OF A CATALYTIC CONVERTOR USING A SOLAR CELL ARRAY

(75) Inventors: Venkata Prasad Atluri, Ann Arbor, MI (US); Yongsheng He, Sterling Heights, MI (US); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 13/075,233

(22) Filed: Mar. 30, 2011

(65) Prior Publication Data

US 2012/0247084 A1   Oct. 4, 2012

(51) Int. Cl.
  *F01N 3/00* (2006.01)
(52) U.S. Cl.
  USPC ............... 60/274; 60/275; 60/276; 60/286; 60/300; 60/303; 180/2.2; 180/207.2
(58) Field of Classification Search ............ 60/274, 60/275, 276, 277, 284, 286, 300, 303; 180/2.2, 180/207.2
  See application file for complete search history.

(56) References Cited

U.S. PATENT DOCUMENTS

| | | | |
|---|---|---|---|
| 5,155,995 A | 10/1992 | Kinnear et al. | |
| 5,488,283 A | 1/1996 | Dougherty et al. | |
| 5,707,593 A | 1/1998 | Wang | |
| 5,804,149 A * | 9/1998 | Ota et al. | 422/174 |
| 6,212,882 B1 * | 4/2001 | Greger et al. | 60/274 |
| 6,951,099 B2 | 10/2005 | Dickau | |
| 7,001,445 B2 * | 2/2006 | Petersson et al. | 95/11 |
| 7,338,335 B1 * | 3/2008 | Messano | 180/65.22 |
| 7,493,974 B1 * | 2/2009 | Boncodin | 180/2.2 |
| 7,827,782 B2 * | 11/2010 | Theis | 60/286 |
| 7,854,282 B2 * | 12/2010 | Lee et al. | 180/65.24 |

* cited by examiner

*Primary Examiner* — Binh Q Tran
(74) *Attorney, Agent, or Firm* — Reising Ethington P.C.

(57) ABSTRACT

An internal combustion engine vehicle or hybrid-electric vehicle is provided with a vehicle-mounted solar cell array capable of generating electrical power. The solar cell array and other elements, including a metal substrate catalytic convertor form a system for reducing exhaust gas emissions from the vehicle in which the power from the array is applied to minimize exhaust emissions. A primary application of the solar cell array-generated power is to preheat the catalytic convertor to a preferred operating temperature prior to engine start. But the power from the solar cells, directed by a controller, may also be applied to charge the battery or to power electric power receiving devices, for example, to control cabin temperatures. The preferred allocation of the solar power available depends on a number of factors including the state of charge of the batteries, and the time of anticipated next use of the vehicle.

14 Claims, 5 Drawing Sheets

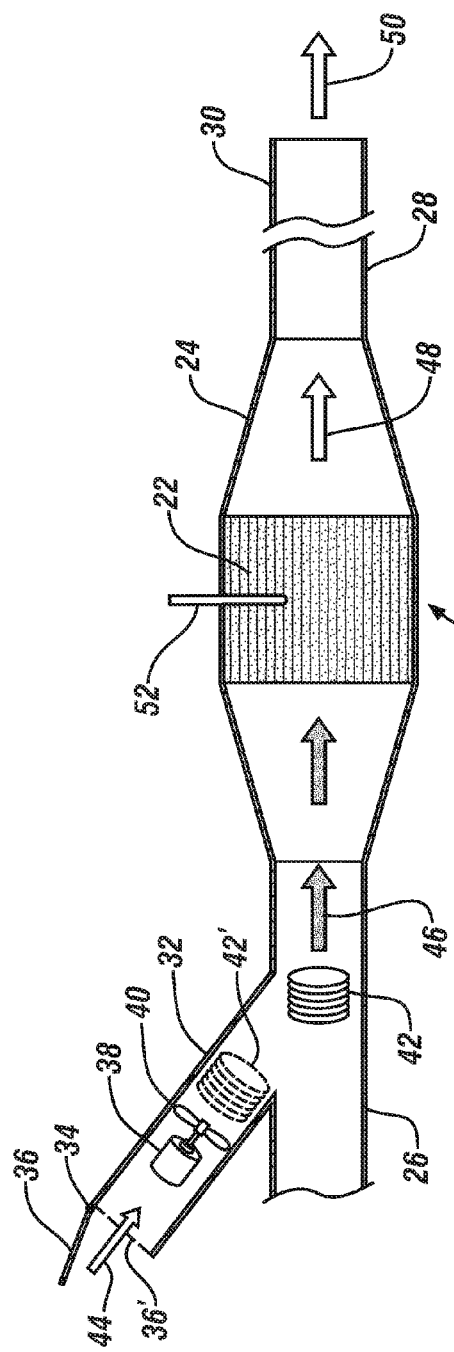
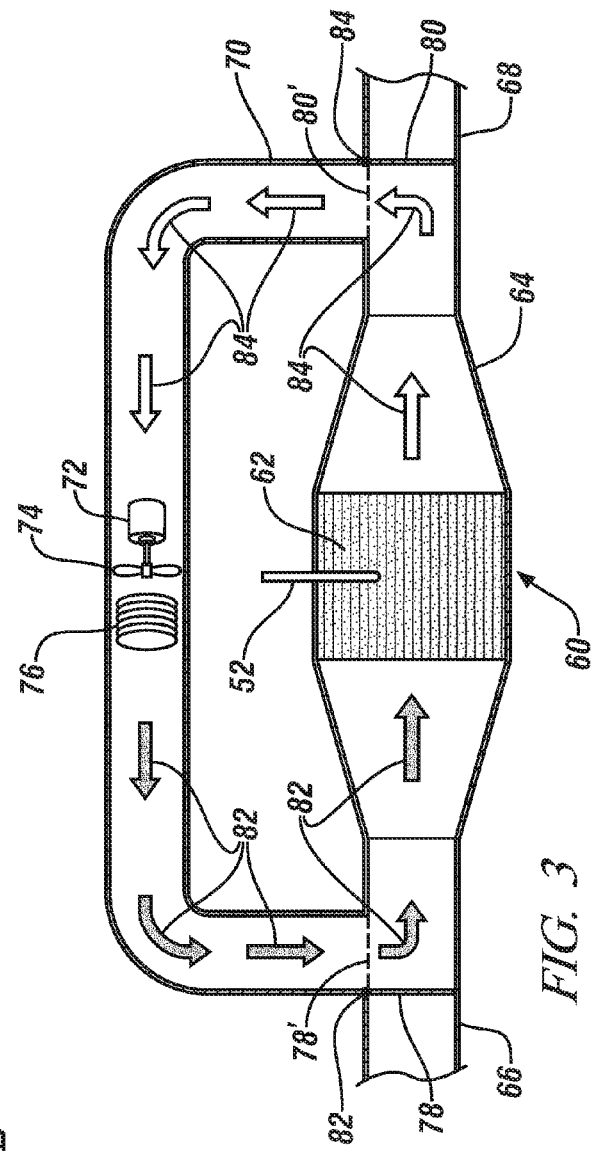

ELECTRIC PREHEATING OF A CATALYTIC CONVERTOR USING A SOLAR CELL ARRAY

TECHNICAL FIELD

This invention pertains to systems and methods for preheating catalytic convertors prior to an engine cold start using automotive electrical power systems incorporating photovoltaic or solar cell arrays. The catalytic convertors may be adapted to minimize the heat energy required to raise their temperature from ambient temperature to their operating temperature. The output from on-vehicle sensors and input data of when a vehicle will next be operated are used by a controller to allocate power harvested from the solar cell array most efficiently in reducing vehicle exhaust emissions.

BACKGROUND OF THE INVENTION

The broad implementation of a catalytic convertors adapted to manage and promote reaction of polluting chemical species exhausted by internal combustion engines has been very effective in reducing the extent of pollution attributable to automobiles and trucks. The effectiveness of the catalyst materials used depends on their operating temperature and has been optimized to enable peak or near-peak convertor performance when the engine is at its normal engine operating temperature. At lower catalytic convertor temperatures, even temperatures not significantly lower than those developed under normal engine operating temperatures, the ability of a catalyst to suitably promote exhaust gas reactions for control of pollutants is dramatically reduced.

Such reduced catalytic convertor temperatures are commonly encountered during the heat-up of an engine from a cold-start from ambient temperature, about 25° C. or so. Catalyst heat-up occurs much more rapidly than engine heat-up but it can still take about 100 seconds for a catalytic convertor to reach its effective operating temperature, commonly described as its light-off temperature. During this period little or no exhaust gas pollutant reduction occurs and an appreciable proportion of the pollutants emitted by the vehicle in a typical urban driving are emitted during this catalyst warm-up period.

There is therefore interest in reducing the duration of this catalyst warm-up period.

SUMMARY OF THE INVENTION

It is an object of this invention to provide, in a vehicle with an internal combustion (IC) engine and an exhaust system incorporating a catalytic convertor for control of tail-pipe emissions, a system for solar-powered electrical preheating of a catalytic convertor. The system is intended to reduce total vehicle tailpipe emissions by initiating convertor heating prior to an anticipated vehicle start time, input by a vehicle operator, so that the convertor is at its preferred operating temperature when an operator starts the vehicle. The system requires an on-board computer to receive and process sensor inputs from the convertor and solar cell to properly synchronize convertor heating with a vehicle operator's schedule. Any solar-generated power not allocated to preheating the convertor may be distributed by the computer according to a pre-established algorithm.

Hybrid electric vehicles incorporating internal combustion engines and conventional IC engine powered vehicles derive at least part of their power from operation of an IC engine. The exhaust gases from these IC engines, gasoline-powered or diesel-powered, are treated by one or more catalytic convertors which promote chemical reactions to reduce the concentration of any pollutants in the exhaust gas. But, until it attains a temperature of greater than about 300° C. the convertor will perform less than optimally. This less than optimal performance may extend for some period when a vehicle is first started. For example, on starting a vehicle whose engine and convertor are both at about ambient temperature, or about 25° C., it may take about 100 seconds or more for the hot exhaust gases to heat the catalytic convertor to its operating temperature. Further, during this warm-up period, the engine is operated with a fuel-rich air-fuel mixture, reducing the vehicle's fuel economy.

The time for the convertor to reach its preferred operating temperature may be reduced if the convertor may be preheated to raise its temperature prior to engine start. But the power requirements may be significant and tax the capabilities of a nominally 12-volt vehicle battery in a conventional IC-engined vehicle or of a higher voltage traction battery in a hybrid or electric vehicle.

An approach to overcoming or reducing the power demands on the battery is to employ a solar cell array to generate at least a portion of the electrical energy needed to preheat the convertor. However, the addition of solar cell array to a vehicle dedicated solely to preheating the catalytic convertor is inefficient. It is preferred to integrate the power available from the solar cell array into the vehicle electrical system so that it may be properly managed and stored. Alternative catalytic convertor configurations may be used to reduce the power requirements.

An integrated system which addresses these needs includes: a catalytic convertor heater; a catalytic convertor employing a metal foil substrate catalytic convertor with low thermal mass and high thermal conductivity to reduce heating energy demands; a photovoltaic device or solar cell array for generating electricity and incorporated into the vehicle electrical system; an on-board computer or controller for determining and allocating the solar cell array power to reduce emissions; and a communication and control means for remotely initiating convertor preheating.

The catalytic convertor may be preheated by passing heated air through the convertor. In a first heater embodiment an electric heater element which may be an exposed or protected wire-wound resistive element or a cartridge element or any other suitable electric heater configuration known to those skilled in the art may be placed in the vehicle exhaust system upstream of the convertor. A fan and air inlet may be mounted upstream of the heater, so that operation of the fan and heater element will pass heated air through the convertor to be exhausted at the vehicle tailpipe. In a second embodiment a closed gas circuit may be made around the convertor and its attached exhaust components so that the heater element and fan mounted in the closed gas circuit may recirculate heated air through the convertor until it reaches its operating temperature. Both embodiments may incorporate appropriate valving to isolate the heater from the remainder of the exhaust system during convertor preheating and to direct the exhaust gas flow through only the convertor during engine operation.

Current catalytic convertors make extensive use of sintered, extruded cordierite honeycomb structures as catalyst supports. But metal foil substrate convertors have improved volumetric efficiency and permit reducing convertor size and thermal mass relative to a cordierite substrate convertor and so require a lower energy input.

Vehicles using high performance solar cell arrays mounted on a vehicle roof may harvest between about 150 and 200 watts of solar power when irradiated under a full sun. The individual solar cells in the solar cell array may be interconnected to enable the solar power to be harvested at a voltage suitable for charging a vehicle storage battery or, in an electric or hybrid vehicle, a higher voltage traction battery.

The power output by the solar cell array may also be directly employed to operate devices compatible with such a storage battery, including, but not limited to, a preheater for a catalytic convertor. The output of the solar cell array is not dedicated to a convertor pre-heater. Rather the output of the solar cell array is directed so that the total vehicle exhaust emissions are reduced and preferably minimized. The strategy adopted will depend on the specific scenario, so that a controller, with input from some number of on-vehicle sensors, may suitably direct the solar-derived power. In this specification and claims, a controller is both a hardware device capable of switching, using relays or solid state switches, electrical power to any of a number of devices, and a logical device capable of storing and implementing an algorithm.

For example, when a vehicle is parked and no immediate use is contemplated the solar cell array output may be applied to charge the battery. If the vehicle is parked, vehicle use is anticipated, and the catalytic convertor has cooled down, the solar cell array may be employed to preheat the catalytic convertor. In this case it will be necessary to know when the driver will return and the current output of the solar cell array since it is preferred to synchronize, the attainment of convertor operating temperature and vehicle engine start. So the energy requirements of the convertor and the power output of the solar array must be known to initiate convertor heating sufficiently early prior to the driver's return to enable the convertor to reach its operating temperature prior to engine start. If the vehicle is parked, vehicle use is imminent but the catalytic convertor is still not at its operating temperature the battery may be used to supplement the solar array output and increase the heating rate of the convertor. Of course, yet further applications of the solar array power may be considered if the battery is fully charged and no immediate use is contemplated. These could include preheating the engine coolant or preconditioning the vehicle cabin.

Distribution of the solar cell array power therefore requires a controller and at least one sensor to monitor the temperature of the catalytic convertor as well as a sensor to detect the current output of the solar cell array. The controller is tasked, through its algorithm, with interrogating the sensors and, based on their signals, may suitably direct the output of the solar cell array to nominally 12V loads, including a battery, or to a high voltage battery pack.

It is preferred that the time the pre-heated convertor achieves its operating temperature be synchronized with vehicle engine start. But even an exemplary metal substrate catalytic convertor with 600 cells per square inch (600 cpsi) employing 50 micrometer (50 µm) thick foil requires about 88 kilo joules of energy to heat it from ambient temperature, or about 25° C., to 350° C. A solar cell capable of delivering 200 watts would take about 440 seconds to deliver this required 88 kilo-joules. Thus convertor heating must be initiated an appreciable time prior to engine start. Hence the system may also include a communication device to receive input, from a vehicle operator on when the vehicle will be next started.

The operator may provide input in numerous ways, including a timer, set on exiting a vehicle, or by cell-phone communication to an in-car communication system such as Onstar®, among others. Such an input would be a part of an algorithm used by the controller to direct sufficient power to the convertor pre-heater to ensure that the convertor was at its preferred operating temperature based on an anticipated vehicle re-start time.

These and other aspects of the invention are described below, while still others will be readily apparent to those skilled in the art based on the descriptions provided in this specification.

BRIEF DESCRIPTION OF THE DRAWINGS

FIG. 2 shows a schematic view of a first embodiment of a heater system for a catalytic convertor.

FIG. 3 shows a schematic view of a second embodiment of a heater system for a catalytic convertor.

DESCRIPTION OF PREFERRED EMBODIMENTS

There is continuing interest in reducing the quantity of gaseous pollutants emitted by the internal combustion (IC) engines of motor vehicles. This applies not only to conventional vehicles powered exclusively by IC engines, but also to hybrid vehicles in which an IC engine and electric motor cooperatively provide traction power to the vehicle.

Significant advances have been made in catalyst-promoted exhaust gas after-treatments, but because of lesser catalyst effectiveness at temperatures less than about 300° C., appreciable release of pollutants may occur during catalyst heat-up after a cold start. Hence there is interest in preheating catalytic convertors to their operating temperature to reduce cold start emissions.

Automotive exhaust aftertreatment catalysts are commonly one or more noble, or platinum group, metals including platinum, palladium and rhodium, thinly deposited on a high surface area substrate. Substrates incorporating a plurality of gas channels, the walls of which serve as catalyst supports, are commonly used. A common substrate material is cordierite and extruded cordierite substrates with up to 400 channels per square inch are in widespread use. However, the energy required to heat such a cordierite substrate convertor from about 25° C. to about 300° C., is estimated to range from between 150 to 180 kilo-joules.

Figure 1:
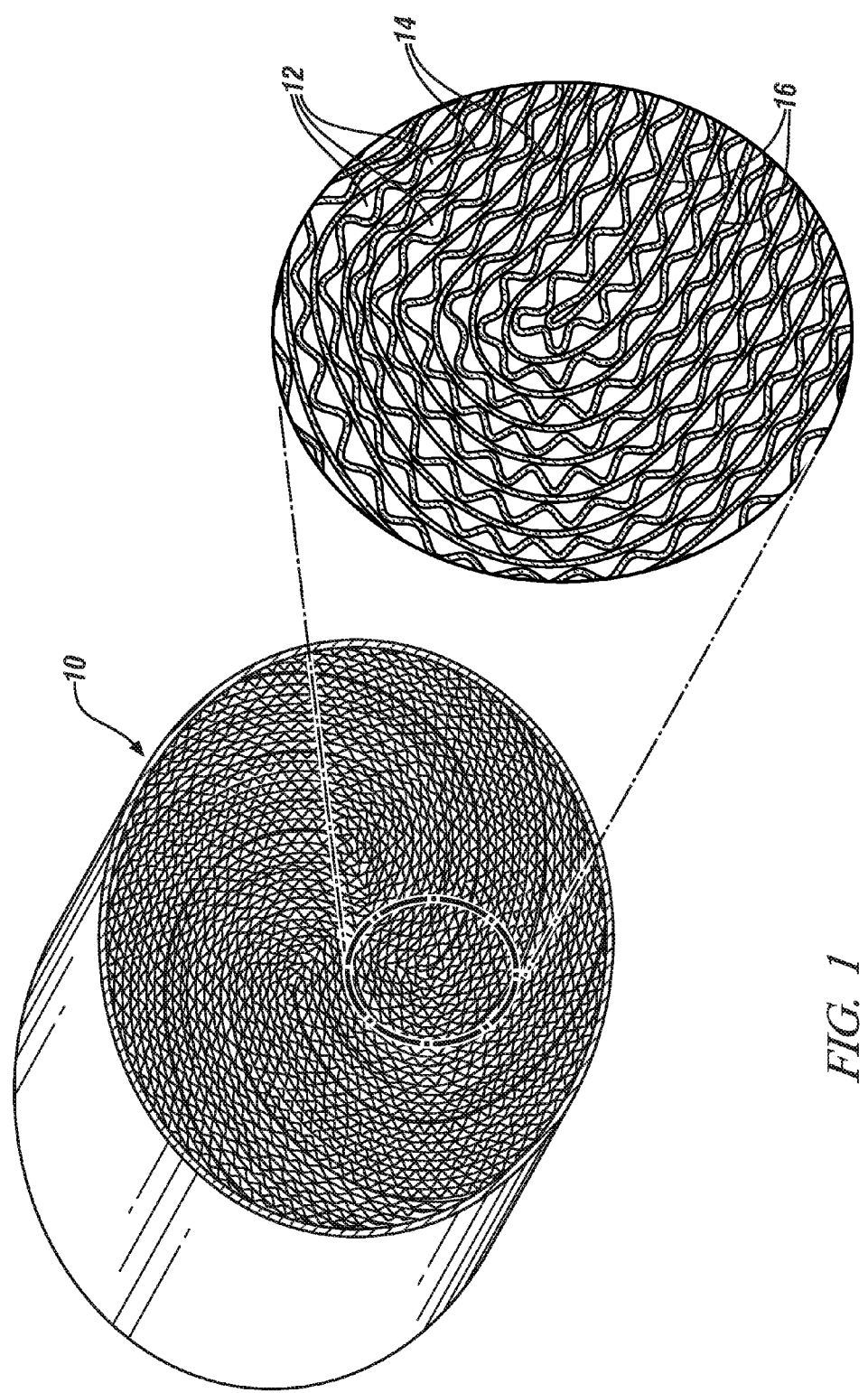
FIG. 1 shows, in perspective view an exemplary metal substrate catalytic convertor with an inset showing details of the metal foil geometry.

This energy burden may be reduced by using a (metal) foil-substrate convertor such as is shown at 10 in FIG. 1 in which the cells 12 are formed by corrugated sheets 14 which overlie flat sheets 16. The use of a thin foil substrate material, which may be as thin as 30 micrometers, enables higher channel densities—convertors may have up to 1000 channels per square inch—resulting in shorter channel lengths and lower thermal mass. The thermal mass may be yet further reduced by introducing turbulence-inducing features to the substrate, particularly the corrugated sheet portion of the substrate, which promote better gas-catalyst access and further reduce channel length. In an exemplary embodiment of 600 cpsi/50 μm foil metal substrate convertor, the reduced thermal mass enables heating the foil-substrate convertor to about 300° C. using only 88 kilo-joules. This is only about half of the energy required by a cordierite-substrate convertor.

Any suitable electricity-powered heating device and procedure may be followed. For example resistance heated wires may be embedded in the convertor itself or the convertor casing may be externally heated. In service, of course, the heated exhaust gas heats the convertor as it flows through the convertor. Such hot gas heating has the advantage that each gas channel is heated in parallel, dramatically reducing the need for extensive heat conduction through the convertor. A similar approach is preferred for the electricity-powered heating of this invention.

FIG. 2 shows a first embodiment of the convertor heating device. A portion of vehicle exhaust system 20 which includes catalytic convertor 22 is contained in canister 24 and located between exhaust inlet 26 and exhaust outlet 28 which terminates in tailpipe 30. One end of heater inlet air pipe 32 is attached to exhaust inlet 26 in a 'Y' configuration. Heater inlet air pipe 32 terminates on its second end in a valve, here shown as flapper valve 36 pivoting about pivot 34 and operable between a closed position, shown in ghost as 36' and open position 36. Positioned in heated inlet air pipe 32 is electric motor 38 powering fan 40, closefitted to pipe 32 to ingest cool outside air, shown as arrow 44 into pipe 32. Incoming airflow 44 passes over heater 42 located in exhaust inlet 26 or, optionally, in pipe 32 where it is shown in ghost as 42'. The cool inlet air exits heater 42 (or 42') as heated inlet air 46 which then passes through catalyst 22, losing heat to the catalyst and exiting at a lower temperature as exit air 48 and continuing to lose heat during its passage down the remainder of the exhaust system before exiting at tailpipe 30 as airflow 50. The catalyst temperature may be monitored using temperature sensor 52.

It will be appreciated that only some of the heat in heated inlet air 46 will be transferred to catalyst 22. The excess heat carried off in exit gas 48 is wasted. As will be discussed shortly, the heating demands of the catalytic convertor, even the metal substrate catalytic convertors used in this invention, are substantial when compared to the on-board vehicle stored energy. Hence the thermal losses for the heating system embodiment shown in FIG. 2 may be unacceptable.

An alternative heating system embodiment is shown in FIG. 3. Here a recirculating system is employed so that the heat contained in the gases exiting the convertor is not lost. The exhaust and convertor configuration is not dissimilar from that shown in FIG. 2. A portion of vehicle exhaust system 60 which includes catalytic convertor 62 is contained in canister 64 and located between exhaust inlet 66 and exhaust outlet 68. A generally 'U'-shaped heater pipe 70 is positioned to that one leg of the 'U' merges into the exhaust 60 at exhaust inlet 66 while the second leg of the 'U' merges into exhaust 60 at exhaust outlet 68. Heater pipe 70 thus completes a recirculatory path which includes a portion of exhaust system 60 and, particularly, catalytic convertor 62.

Contained within pipe 70 is a motor 72, powering fan 74, close-fitted to pipe 70, and a heater 76. The recirculatory path may be isolated from the remainder of the exhaust system by valves 78 and 80, here shown as flapper valves pivoting about pivots 82 and 84 respectively. Valves 78 and 80 are shown in their open (with respect to heater pipe 70) position. In their closed position identified as 78' and 80' and shown in ghost, heater pipe 70 may be isolated from exhaust system 60.

With the valves in their open position, air trapped within the recirculation path may be impelled by fan 74 to pass through heater 76 to exit heater 76 as heated air 82. Heated air flows in, and is directed by, the recirculation path comprising heater tube 70 and that portion of the exhaust system not shut off by valve 78 to pass through catalytic convertor 62. In passing through catalytic convertor 62 the heated air loses some heat and exits, at a lower temperature as airflow 84. Airflow 84 is directed by valve 80 and heater tube 70 to the inlet of fan 74 where it impelled through heater 76 to repeat the process.

It has been noted that the energy required to heat an exemplary 600 cpsi/50 μm foil metal substrate convertor from ambient temperature, about 35° C., to its light-off temperature or about 350° C. is about 88 kilo-joules. When delivering power at 600 amps, a nominally 12 volt battery would require about 12 seconds to heat such a convertor assuming 100% efficiency. At a more realistic 60% efficiency, 20 seconds would be required. This requirement is comparable to the cold cranking capability (CCA) of many automobile batteries which are rated at 600 CCA. CCA is the maximum current which the battery can deliver for 30 seconds while maintaining a minimum voltage of 7.2 volts when at a temperature of 0° C.

Thus, even if the energy requirements are minimized by use of a metal substrate catalytic convertor the energy requirements for preheating the convertor would tax the capacity of a battery in a conventional IC vehicle. Also, most drivers would find a 20 second delay between turning on the ignition and engine start up unacceptable. These issues may however be overcome by reducing the current and extending the heating time and providing at least some of the heater power from a solar cell array. Reducing the maximum heater current is also beneficial because it enables the use of smaller diameter electric cables and simplifies the heater design.

For driver convenience and to minimize energy wastage it is preferred that the convertor just attain its operating temperature as the driver enters the vehicle. Anticipating the power required to accomplish that requires: knowledge of the power required—which may be inferred from knowledge of convertor temperature; knowledge of the power available—which may be inferred from knowledge of battery state of charge (SOC) and solar cell array power; and knowledge of the time the driver will return. A controller, incorporating both logical capability and power switching capability, is also required to manage these inputs and requirements.

The driver may communicate his anticipated return time in any convenient manner. The simplest approach would be to input, for example using the vehicle radio clock, a return time prior to leaving the vehicle. In vehicles with in-vehicle communication systems, such as On-Star®, a return time could be remotely communicated by cell-phone or a dedicated long-range wireless device might be used. Another potential communication device is the electronic key-fob used to remotely unlock the vehicle doors, among other capabilities. But the maximum range of the key-fob signal is only about 30 meters so that, even if activated at maximum range, it would afford only a delay of only between 15 and 30 seconds before a driver, walking at between 2 and 4 miles per hour arrived at the vehicle. Thus the key-fob may be used to signal imminent vehicle use but is unsuited for providing a primary alert since reliance on the remote door unlock signal of the key-fob would, in most circumstances, allow insufficient time to preheat the convertor from ambient.

In the absence of convective and radiative losses, the energy required for convertor heat-up will generally vary linearly with the required temperature rise. Convective and radiative losses will vary with convertor temperature and may be compensated for through the use of a temperature-compensated loss algorithm or a temperature-compensated lookup table. If on-vehicle computational power is limited, an average loss factor may be used over the entire convertor range.

It is preferred to use only a single temperature sensor to determine the convertor temperature. The proposed hot air preheating scheme described, because it heats all cells in parallel, supports the use of a single temperature sensor since only limited thermal conduction is required to disperse the heat input throughout the convertor body. But, during convertor cooldown, appreciable thermal gradients may develop since heat is conducted from the substrate core to be lost at the container walls. To compensate, a single temperature sensor should be positioned approximately mid-way between the centerline of the substrate core and the container walls. In this location, the sensor may record an average, or near-average, convertor temperature during both heat-up and cooldown.

A preferred power source for convertor heating is a photovoltaic or solar cell array integrated into the vehicle electrical system so that the power derived from the array may be distributed in accord with an algorithm for minimizing exhaust pollutant emission. Currently, photocell arrays capable of delivering up to 15 watts per square foot of cell array are readily available. Thus a fixed, roof-mounted array on a motor vehicle may have a design capability of delivering up to 200 watts of electrical power. Extending the array to other horizontal surfaces of the vehicle, such as the hood or decklid, and/or enhancement of solar cell efficiencies would, of course, increase the output of the array.

The maximum available power output of a solar cell depends on the instantaneous solar irradiance incident on the cell. Since the energy to heat the convertor may be calculated, and energy equals the product of power and time, the available power from the solar cell must be known to estimate the convertor heat-up time under any solar condition. Since the solar irradiance may change frequently, due to clouds or other obstructions, the incident solar power should be measured frequently. The incident solar power may be independently measured using one of several types of stand-alone pyranometers such as thermopile-based or silicon photodiode-based units or the solar cell array may be constructed to incorporate a cell adapted to perform the sense function.

Many hybrid-electric vehicles employ, possibly in combination with a higher-voltage traction battery, a low-voltage (nominally) 12 volt battery for accessories and features such as windshield wiper motors or power door locks as well as powering the starter for the internal combustion engine. Such 12-volt batteries are near-universally used in IC-engined vehicles. The solar cell array should provide an output compatible with such batteries since, under some use scenarios, the solar cell array output may be required to charge these batteries. The charging voltage of a 12 volt lead acid battery over a potential operating temperature range of from −20° C. to 50° C. ranges from 13.5 to 16.5 volts. Thus the solar cell array should be constructed and arranged to be capable of delivering power at up to 16.5 volts. Similar considerations will apply to other battery types and configurations of battery storage systems, such as a high voltage traction battery, and the electrical capabilities of the solar cell array should be well-matched to at least the charging requirements of any battery type used.

It will be appreciated that any vehicle employing a 12-volt battery will incorporate a wide variety of power-receiving devices which might be operated using the solar cell array output. These power-receiving devices, or loads, could include, in addition to a partially-discharged low-voltage battery and a convertor preheater, accessories such as radios or power seats, or comfort features such as heaters or heating-ventilating-air-conditioning (HVAC) blower fans. Once the convertor attains its operating temperature any or a combination of these power-receiving devices may be served by the output of the solar cell array.

When the vehicle is operating, determining the best use of the solar-generated power to reduce exhaust emissions is relatively straightforward. In this circumstance electrical demands are placed on the nominally 12 volt, low-voltage electrical system. These may include the HVAC fan, radio, windshield wipers and others. Generally the best use of the available solar power will be to direct it to the low-voltage battery and use the solar power to partially offset the battery power drain and minimize the load on the alternator. Of course, reducing the demands on the alternator will reduce fuel consumption and thereby reduce tailpipe emissions. Generally the electrical demand of an operating vehicle will exceed the solar cell capability, so that all available solar-generated power may be accommodated by the low-voltage battery to reduce the required output of the alternator.

However, the major benefit of the solar cells is that they are also capable of generating power when the vehicle is parked. In this case the solar cell array-generated power may be used to charge the battery to reduce future alternator-generated power.

But, as discussed, a more dramatic reduction in emissions may be achieved if the catalytic convertor is preheated to its operating temperature prior to engine start. Thus there is benefit in using the solar cell array-generated power to preheat the convertor. These, and other, alternative uses of the solar power may be managed using a controller to direct the solar power to most effectively minimize vehicle emissions. The controller implements an algorithm for reducing emissions, described later, and receives sensory inputs from the major system devices.

Figure 4:
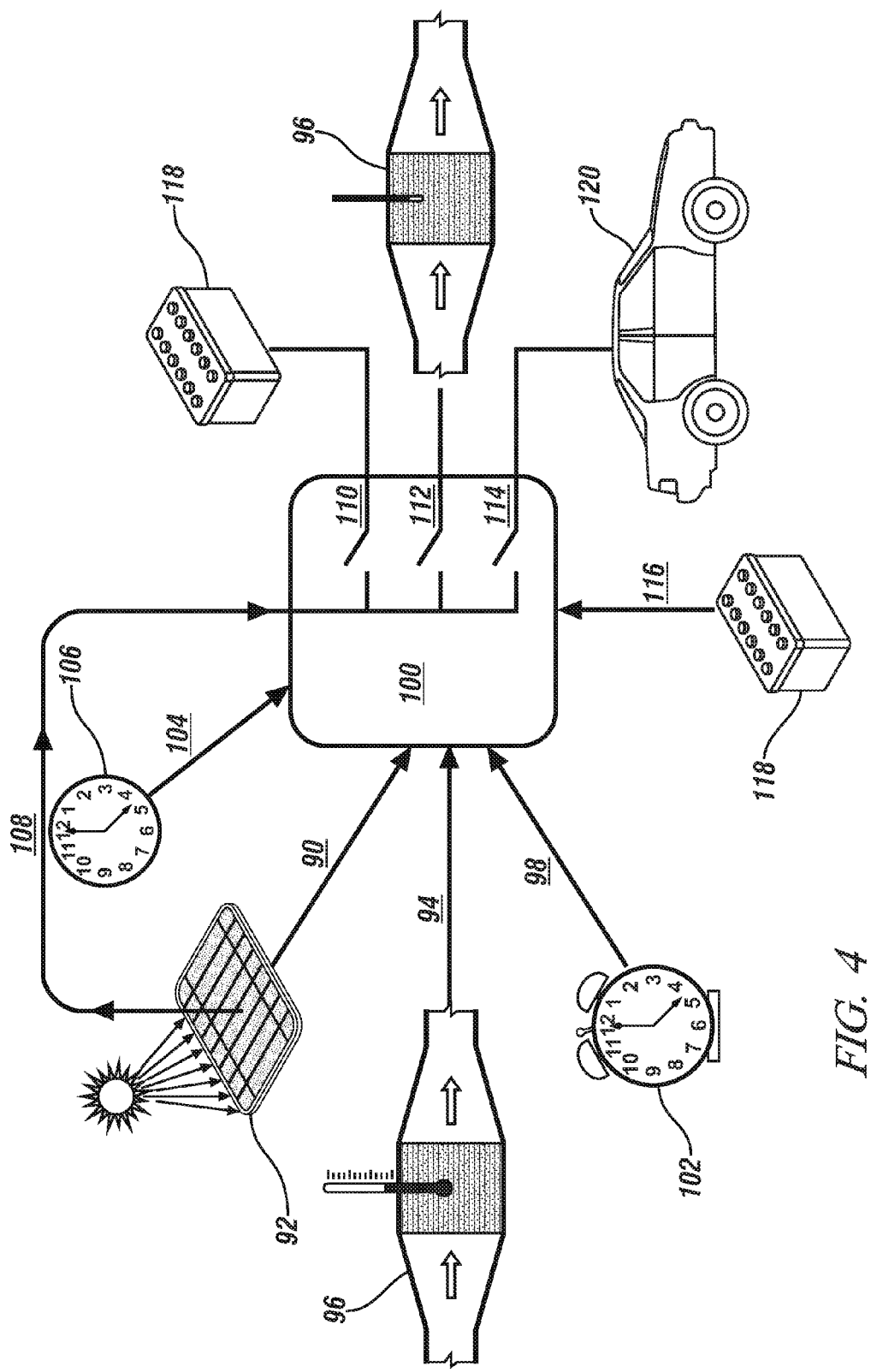
FIG. 4 shows a schematic illustration of a controller for directing the power from a solar cell array to a variety of devices including a catalytic convertor preheater. The sensory inputs to the controller are also shown.

Such a system is shown in outline in FIG. 4. Controller 100 receives inputs from devices including clock 106, solar cell array 92, metal substrate convertor 96, timer 102 and battery 118, and on the basis of these inputs and a suitable algorithm determines whether to allocate the power 108 from solar cell 92 to battery 118 via switch 110, to convertor 96 via switch 112 or to some other power-receiving device in vehicle 120 via switch 114. The inputs are: the available power output 90 from solar cell 92; the temperature 94 of convertor 96; the state of charge (SOC) 116 of battery 118; the current time 104 from clock 106; and the anticipated time of vehicle use 98 from alarm 102.

In operation controller 100 may poll each of the devices on a pre-set schedule, ranging from once per second to once per 100 seconds. The polling may be equally frequent for all devices or more frequent for some, like the convertor temperature and less frequent for others, like the anticipated time of vehicle use. The inputs may be smoothed or averaged to reduce noise. Generally it will be preferred to average the solar cell array output since this, due to climatic variations, is likely to show significant variability over relatively short, time periods, possibly on the order of minutes.

It is anticipated that controller 100 is a computer. The controller 100 may be dedicated and independent of other computing devices in the vehicle, or it may be implemented in computing resources currently resident in the vehicle, such as the ECU or engine control unit, or the body control module if the incremental computing load represented by controller 100 does not compromise the primary function of the computing resource.

Figure 5:
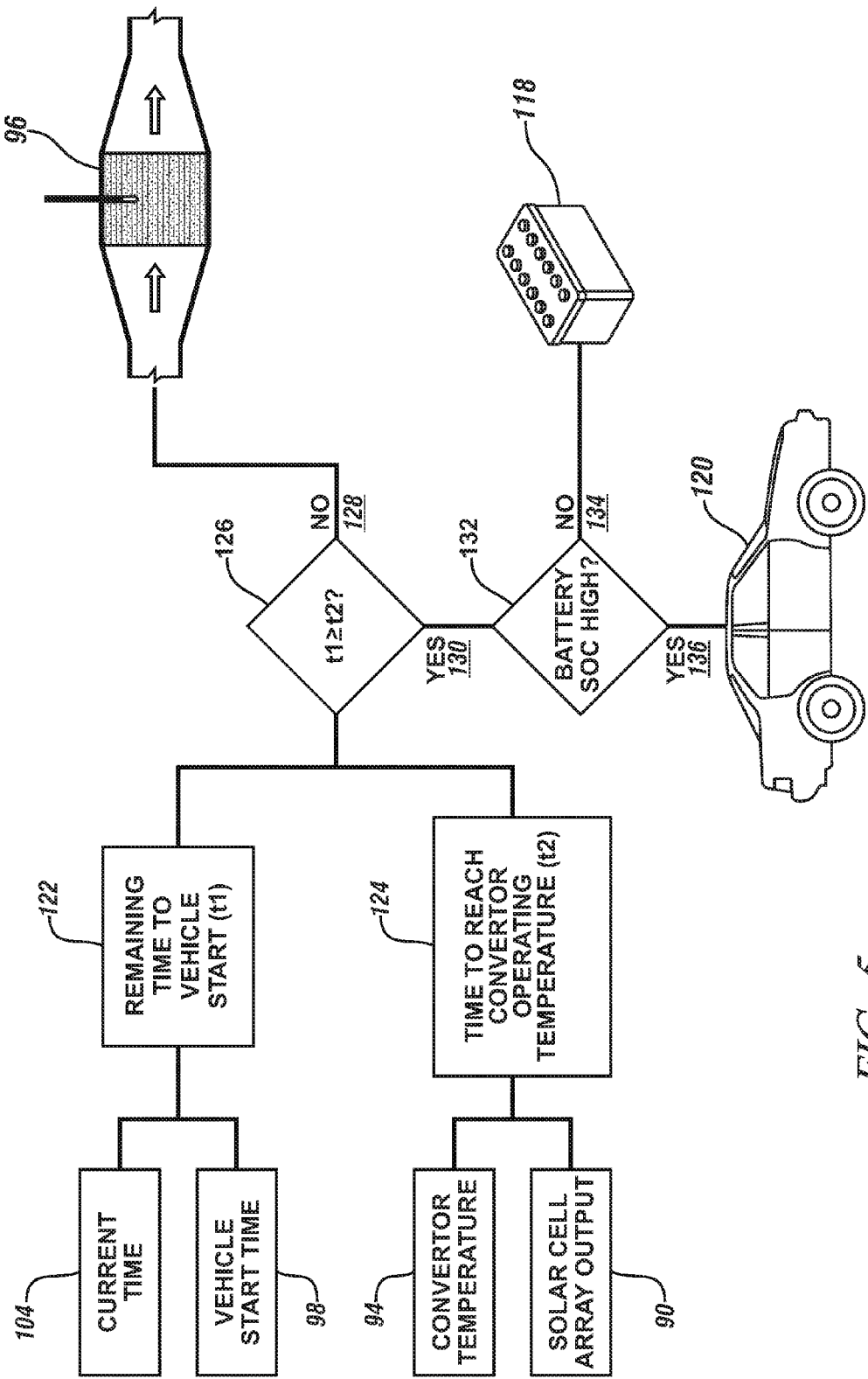
FIG. 5 shows a flowchart which might be implemented by the controller of FIG. 4 to determine to which device the output of the solar cell array should be directed to best minimize exhaust gas emissions.

Based on these inputs the controller 100 may follow an algorithm to allocate the power from the solar array. A block diagram of such an algorithm is shown in FIG. 5.

Knowing the current time 104 and the anticipated vehicle start time 98, the time remaining before vehicle start (t1) 122 may be determined. Knowing the convertor temperature 94 and the solar cell array output 90, the time required to heat the convertor to its operating temperature (t2) 124 may be calculated using the known thermal characteristics of the convertor. Comparing t1 and t2 determines how the power from the solar cell array is to be allocated as indicated at decision box 126. If t1≦t2, branch 128, then solar cell array power is directed to preheat convertor 96.

Alternatively if t1>t2, branch 130, then the convertor may be preheated to its operating temperature in less time than remains before the anticipated vehicle start time 98 and there is no need to allocate solar power to convertor 96 and the algorithm progresses to decision box 132. At decision box 132, the state of charge of the battery is evaluated. If the battery is less than fully charged, branch 134, then the solar power may be directed to the battery 118.

The vehicle may incorporate a plurality of power-receiving devices operable with the solar cell array-generated power. If the battery is fully or near-fully charged, branch 136, the solar cell array power may be distributed within the vehicle 120 according to some previously-developed algorithm. For example, on a warm sunny day, the vehicle interior may reach elevated temperatures, temperatures which an operator, on returning to the vehicle, will deem uncomfortable. Thus immediately on entering the vehicle, an operator might be expected to turn on the HVAC fan to introduce exterior air or possibly, depending on the outside air temperature to turn on both the fan and an air conditioner. If the low-voltage battery is already adequately charged the solar cell array may operate the HVAC fan, and possibly the air conditioner, to reduce the interior temperature prior to the operator's return. This, in turn, would reduce the necessity for the returning operator to aggressively cool the vehicle interior while driving, and thereby lessen future battery and alternator demands. A similar stratagem might be employed on a cold day when the HVAC fan and the heater might be required.

It will be appreciated that although the depiction of FIG. 5 indicates that the available solar cell array power is directed exclusively to each of the options shown, it may be feasible to partition the available solar cell array power and allocate it proportionately. Also, for simplicity, the algorithm shown in FIG. 5 is not shown as recursive, but, it will be appreciated that the procedure shown is dynamic and that changed conditions may lead to changed outcomes. So, it is intended that the computer as it polls the various sensors shown in FIG. 4 will repetitively execute the computational and decision steps of FIG. 5 and update the allocation power from the solar array accordingly.

The logic of the flow diagram shown in FIG. 5 is reactive, that is responsive to changed conditions detected by the sensory inputs. But the logic may be modified to anticipate future conditions and improve the power allocation algorithm. For example, the solar cell output will vary with time of day and season in a predictable manner, even on a cloudless day. This time- and season-varying behavior may also be incorporated in the algorithm, possibly in a look-up table, to estimate, based on the present output, the solar cell array output at a later time. As a further example, knowledge of the cool down characteristics of the convertor, enables estimating the future temperature of the convertor to enable an earlier estimation of when convertor heating should be initiated. Such an earlier estimation may prompt changes in the power allocation strategy. For example, it may be deemed appropriate to initiate heating of the convertor, under reduced power, earlier than might otherwise be required, so that complete cool down of the convertor does not occur. This could provide a safety margin against an earlier than expected driver return or a dramatic and unanticipated reduction in solar cell array output resulting from meteorological changes.

The time required to preheat the exemplary 600 cpsi/50 μm foil thickness convertor using 200 watts of available power is about 7 minutes and proportionately greater if less power is available. Since the output of the solar cell array may vary during this heating period a safety margin of between about 5% and up to about 30% may be incorporated into the algorithm. The magnitude of the safety margin may adjustable and could be modified based on user experience.

Figure 6:
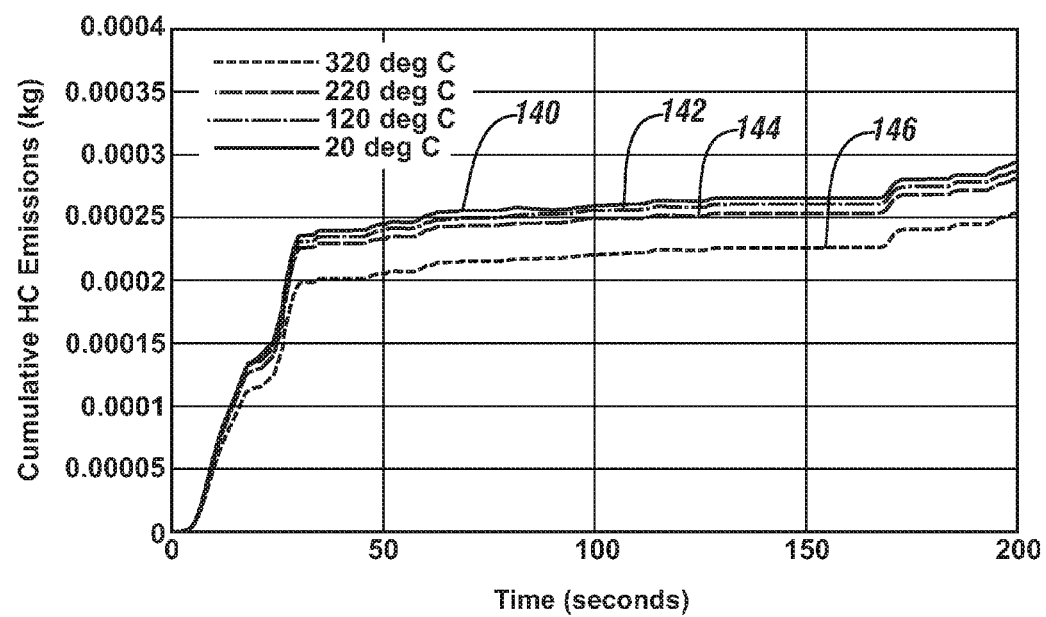
FIG. 6 shows a graph illustrating the effect of initial catalytic convertor temperature on cumulative hydrocarbon (HC) emissions from a vehicle during a driving cycle.

FIG. 6 shows the total emissions as a function of engine operating time, generated after a cold start for four convertor temperatures. Clearly, raising the temperature of the convertor reduces the cumulative hydrocarbon (HC) emissions but the effect is highly non-linear. Increasing the convertor temperature from 20° C. (curve 140) to 120° C. (curve 142) barely effects any reduction in cumulative emissions. Increasing the convertor temperature from 20° C. (curve 140) to 220° C. (curve 144) effects a cumulative emission reduction of about 0.000013 kilograms but increasing the convertor temperature from 20° C. (curve 140) to 320° C. (curve 146) reduces cumulative emissions by about 0.00004 kilograms. Thus raising the convertor temperature by an additional 100° C., to 320° C., is about three times as effective as heating to 220° C.

Hence it is preferred that the convertor temperature be at or above about 300° C. on engine start. If necessary, for example due to changes in climatic conditions which reduce the solar cell array output to less than expected levels, battery power may be used to supplement the solar cell array-generated power. A convenient trigger for initiating the supply of supplementary power may be a remote door unlock signal emitted by the key-fob. On receipt of such a door-unlock signal the controller may sense the convertor temperature. If the convertor temperature is less than the preferred convertor operating temperature but above a threshold temperature, say 250° C., the controller may direct the battery to deliver some limited supplementary electric power to the heater, say about 200 watts or as limited by the current-carrying capability of the heater or the heater power cable, until either the convertor temperature attains its operating temperature or the engine is started. If the convertor temperature is less than the threshold temperature, only small incremental emission reductions obtain on small increases in convertor temperature, and supplemental battery power should not be used.

This capability to trigger battery-powered preheating on receipt of a key-fob signal may also be beneficial at night when the solar array will generate little or no power. Although the computer may continue to repetitively exercise the preheater algorithm, the power derived from the solar cell will effect substantially no preheating of the convertor. However, for trips interrupted by only short stops, for example a trip to the store, where little convertor cooling occurs the ability to re-heat the convertor to its operating temperature using the battery may still enable emission reduction on engine re-start.

Solar cells approximate constant current power sources. That is, up to a specified voltage, the current supplied by a solar cell is substantially constant, falling off dramatically with further increase in current draw. Because of this the solar cell array must be managed. Too small a current draw underutilizes the capabilities of the array while efforts to extract excessive current from the array dramatically reduces the power available. Managing the array output directed to charging batteries or supplying purely resistive loads such as heaters is relatively straightforward. The power draw of motors, such as the convertor heater motor (38 in FIG. 2 or 72 in FIG. 3) may be controlled using pulse width modulation techniques as are well known to those skilled in the art.

The practice of the invention has been illustrated through reference to certain preferred embodiments that are intended to be exemplary and not limiting. The full scope of the invention is to be defined and limited only by the following claims.

The invention claimed is:

1. A method of reducing exhaust gas emissions on starting an internal combustion engine in a vehicle; the vehicle also comprising an exhaust system for conversion of unwanted products of combustion from the engine, the exhaust system comprising a metal substrate catalytic converter with a temperature sensor, and an electrically powered heater for heating the converter with heated air; the vehicle also comprising a solar cell array power source with a sensor and adapted to deliver electrical power when illuminated with solar radiation; the vehicle further comprising at least one computer, for management of the operation of the vehicle engine, the operation of the exhaust system, and the operation of the solar cell array power source; the method being performed repetitively, using the computer, starting when the computer receives an input time for a future engine start, and then comprising the steps of:
sensing the current time; and computing a waiting time period before a required engine start; sensing the current temperature of the catalytic converter and determining an amount of electrical energy to heat the converter to a predetermined operating temperature for its effective conversion of engine combustion products;
sensing the current electrical output of the solar cell array, and estimating a heating time period for heating the converter to the predetermined operating temperature using the solar array; and, when an estimated heating time period is within a predetermined time range less than a current waiting time period,
energizing the converter heater with electrical power from the solar cell array to preheat the metal substrate converter to its predetermined operating temperature before the engine is started.

2. The method recited in claim 1 in which the predetermined operating temperature of the metal substrate converter is about 320° C.

3. The method recited in claim 1 in which the estimated heating time period is between about 1.05 and about 1.3 times a current waiting time period.

4. The method recited in claim 1 further comprising the step of:
estimating the future power available from the solar array at the engine start time and using this estimate of future solar array power to estimate the time required for the power from the solar cell array to provide the energy necessary to heat the convertor from its current temperature to its preferred operating temperature.

5. The method recited in claim 1, further comprising the steps of:
the vehicle receiving a remote door unlock signal from a key-fob; then, using the on-board computer,
sensing the temperature of the convertor; and
if the convertor temperature is at least 250° C., providing, from a vehicle battery a predetermined quantity of additional electrical power to the convertor heater until the engine is started.

6. The method recited in claim 5 in which the predetermined quantity of additional electrical power to the convertor heater is about 200 watts.

7. A method of allocating electrical power generated by a vehicle-mounted solar cell array to reduce exhaust gas emissions from an internal combustion engine in a vehicle after starting the engine; the solar cell array having a power output sensor, the vehicle having an on-board computer, a clock, a battery, a plurality of power-receiving devices and an exhaust system, the exhaust system comprising a catalytic convertor with a temperature sensor and an electric catalytic convertor heater for passing heated air through the convertor, the method comprising:
inputting an estimated engine start time into the computer; then, using the computer, repeatedly;
sensing the current time and, using the estimated engine start time, estimating a time duration before the estimated vehicle engine start;
sensing the convertor temperature;
estimating a time required to heat the convertor from its current temperature to its preferred operating temperature;
estimating a time duration before a required vehicle engine start;
sensing a state of charge of the battery; then,
comparing the convertor heating time to the estimated time duration; and,
if the heating time is less than the time duration and the battery is discharged, allocating the solar cell array-generated power to charge the battery; or
if the heating time is less than the time duration and the battery is charged, allocating the solar cell array-generated power to one or more of the plurality of power-receiving devices; or
if heating time is greater than or equal to the time duration, allocating the solar cell array-generated power to energize the catalytic convertor heater.

8. The method recited in claim 7 further comprising the step of increasing the convertor heating time by a factor of between about 1.05 and about 1.3 to provide a safety margin.

9. The method recited in claim 7 in which the catalytic convertor is a metal substrate catalytic convertor.

10. The method recited in claim 7 in which the preferred operating temperature for the catalytic convertor is at least about 320° C.

11. The method recited in claim 7 in which the engine start time is locally input into the computer by a vehicle operator.

12. The method recited in claim 7 in which the engine start time is remotely input into the computer by a vehicle operator using a cellular phone.

13. A system for reducing exhaust emissions from a vehicle with an electrical system and comprising an internal combustion engine and an exhaust system for discharge of products of combustion, the system comprising:
a vehicle-mounted solar cell array with a sensor, to monitor the electrical power output by the array, the output power, being distributed through the vehicle electrical system;
a catalytic convertor with a temperature sensor, the convertor being located in the engine exhaust system and exposed to vehicle exhaust;
an electrically-powered catalytic convertor heater adapted to pass heated air through the convertor and integrated into the vehicle exhaust system;
an on-vehicle computer-based controller, in communication with at least the array power sensor and the convertor temperature sensor, for distributing power from the solar cell array to at least the convertor heater to pre-heat the catalytic convertor to a preferred operating temperature prior to engine start.

14. A system for reducing exhaust emissions from a vehicle with an electrical system and comprising an internal combustion engine and an exhaust system for discharge of products of combustion recited in claim 12 in which the catalytic convertor is a metal foil substrate catalytic convertor.

* * * * *